United States Patent
Dolan et al.

(10) Patent No.: US 8,411,833 B2
(45) Date of Patent: Apr. 2, 2013

(54) CALL ABUSE PREVENTION FOR PAY-PER-CALL SERVICES

(75) Inventors: Stein E. Dolan, Bellevue, WA (US); Marcus Larner, Seattle, WA (US); Gary E. Gallaher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1462 days.

(21) Appl. No.: 11/538,265

(22) Filed: Oct. 3, 2006

(65) Prior Publication Data

US 2008/0080691 A1     Apr. 3, 2008

(51) Int. Cl.
*H04M 3/42* (2006.01)
(52) U.S. Cl. .............. 379/201.01; 379/210.01
(58) Field of Classification Search ............ 379/210.01, 379/88.16, 230, 201.01; 370/259, 230
See application file for complete search history.

(56) References Cited

U.S. PATENT DOCUMENTS

| | | |
|---|---|---|
| 5,555,290 A | 9/1996 | McLeod et al. |
| 6,163,604 A | 12/2000 | Baulier et al. |
| 6,185,194 B1 | 2/2001 | Musk et al. |
| 6,236,722 B1 * | 5/2001 | Gilbert et al. ............ 379/230 |
| 6,337,858 B1 | 1/2002 | Petty et al. |
| 6,356,755 B1 | 3/2002 | Valentine et al. |
| 6,393,113 B1 | 5/2002 | Karras |
| 6,418,212 B1 | 7/2002 | Harrison et al. |
| 6,516,056 B1 | 2/2003 | Justice et al. |
| 6,697,462 B2 | 2/2004 | Raymond |
| 6,707,811 B2 | 3/2004 | Greenberg |
| 6,801,607 B1 | 10/2004 | Marchand et al. |
| 6,862,572 B1 | 3/2005 | de Sylva |

(Continued)

FOREIGN PATENT DOCUMENTS

| | | |
|---|---|---|
| EP | 1545087 A1 | 6/2005 |
| JP | 10-224479 | 8/1998 |

(Continued)

OTHER PUBLICATIONS

International Search Report and Written Opinion dated Jan. 30, 2008 in PCT Application No. PCT/US2007/078374.

(Continued)

*Primary Examiner* — Yuwen Pan
*Assistant Examiner* — Sonia Gay
(74) *Attorney, Agent, or Firm* — Vierra Magen Marcus & DeNiro LLP (57) ABSTRACT

A VoIP-enabled communications system monitors abuse criteria for web initiated telephone calls. A hyperlink in user interface code allows a web-based user to initiate a telephone call to a target telephone number associated with the hyperlink, particularly to merchants of goods and services. If the user clicks on the hyperlink, the target telephone number will be provided to the communications application to facilitate making a telephone call. However, before the call is connected, the user enter a telephone number where the system will call back to bridge the call, and abuse criteria relative to the web-based user's telephone number are evaluated. If the abuse criteria are met, then the call is not connected. For example, one abuse criterion counts the number of times that calls back to the user go unanswered. Another abuse criterion counts the number of times that the target telephone number has been called. If abuse criteria are met, then a voice connection is precluded. Multiple levels of restrictions can be imposed on either the web-based user's telephone number or the target telephone number for repeated violations of the abuse criteria.

20 Claims, 7 Drawing Sheets

U.S. PATENT DOCUMENTS

| | | | |
|---|---|---|---|
| 7,315,518 B1* | 1/2008 | Siegrist | 370/259 |
| 2001/0028642 A1 | 10/2001 | Veschi | |
| 2001/0038624 A1 | 11/2001 | Greenberg | |
| 2002/0054671 A1 | 5/2002 | Weiner et al. | |
| 2002/0111873 A1 | 8/2002 | Ehrlich et al. | |
| 2002/0164006 A1 | 11/2002 | Weiss | |
| 2002/0188680 A1 | 12/2002 | McCormack et al. | |
| 2004/0071130 A1 | 4/2004 | Doerr et al. | |
| 2004/0120484 A1 | 6/2004 | Buzbee | |
| 2004/0165707 A1 | 8/2004 | Raymond | |
| 2004/0249723 A1 | 12/2004 | Mayer | |
| 2004/0249801 A1 | 12/2004 | Kapur | |
| 2005/0074102 A1 | 4/2005 | Altberg et al. | |
| 2005/0084083 A1 | 4/2005 | Lawyer et al. | |
| 2005/0141488 A1 | 6/2005 | Shtivelman | |
| 2005/0154649 A1 | 7/2005 | Jalili | |
| 2005/0216341 A1 | 9/2005 | Agarwal et al. | |
| 2005/0222908 A1 | 10/2005 | Altberg et al. | |
| 2006/0029203 A1 | 2/2006 | Bhusri | |
| 2006/0074760 A1 | 4/2006 | Helin et al. | |
| 2006/0100928 A1 | 5/2006 | Walczak, Jr. et al. | |
| 2006/0188081 A1 | 8/2006 | Hooper et al. | |
| 2006/0259365 A1 | 11/2006 | Agarwal et al. | |
| 2007/0041523 A1* | 2/2007 | Paden et al. | 379/88.16 |
| 2007/0047532 A1* | 3/2007 | Bangor et al. | 370/356 |
| 2007/0112656 A1 | 5/2007 | Howe et al. | |
| 2007/0147343 A1 | 6/2007 | Sasaki et al. | |
| 2007/0162334 A1 | 7/2007 | Altberg et al. | |
| 2008/0181202 A1 | 7/2008 | O'Brien et al. | |

FOREIGN PATENT DOCUMENTS

| | | |
|---|---|---|
| JP | 2001-517033 | 10/2001 |

OTHER PUBLICATIONS

Office Action dated Nov. 29, 2010, Chinese Patent Application No. 200680040336.4.
International Search Report, dated Mar. 30, 2007, International Patent Application No. PCT/US2006/039191 filed Oct. 6, 2006.
Office Action dated Jun. 12, 2008, U.S. Appl. No. 11/262,358, filed Oct. 28, 2005.
Office Action dated Nov. 18, 2008, U.S. Appl. No. 11/262,358, filed Oct. 28, 2005.
Office Action dated May 11, 2009, U.S. Appl. No. 11/262,358, filed Oct. 28, 2005.
Office Action dated Dec. 7, 2009, U.S. Appl. No. 11/262,358, filed Oct. 28, 2005.
Office Action dated May 12, 2010, U.S. Appl. No. 11/262,358, filed Oct. 28, 2005.
Notice of Allowance dated Nov. 24, 2010, U.S. Appl. No. 11/262,358, filed Oct. 28, 2005.
Amendment dated Aug. 20, 2008, U.S. Appl. No. 11/262,358, filed Oct. 28, 2005.
Amendment dated Jan. 20, 2009, U.S. Appl. No. 11/262,358, filed Oct. 28, 2005.
Amendment dated Aug. 11, 2009, U.S. Appl. No. 11/262,358, filed Oct. 28, 2005.
Amendment dated Apr. 7, 2010, U.S. Appl. No. 11/262,358, filed Oct. 28, 2005.
Amendment dated Sep. 13, 2010, U.S. Appl. No. 11/262,358, filed Oct. 28, 2005.
Estevez, et al., "Subscription Fraud Prevention in Telecommunications using Fuzzy Rules and Neural Networks," vol. 31, No. 2, 2006 (in press), pp. 1-31, Santiago, Chile, http://www.cec.uchile.cl/~pestevez/public.html.
"Calling Line Identification the Claimed Needs of Dial-Up ISPs," Jul. 25, 2003, pp. 1-9, Attachment 4, Electronic Frontiers Australia, http://www.efa.org.au/Issues/Privacy/cni-complaints/cni-isps-noneed.html.
"Intrusion Prevention: The Future of VoIP Security," CRT Group, pp. 1-12, http://www.crtgroupinc.com, 2004.
Office Action dated Jan. 20, 2012, U.S. Appl. No. 13/218,982.
Response to Office Action dated Feb. 2, 2012, European Patent Application No. 07842406.6.
Response to Office Action dated Apr. 20, 2012, U.S Appl. No. 13/218,982, filed Aug. 26, 2011.
Japanese Office Action dated Jun. 15, 2012, Japanese Patent Application No. 2009-531516.
Office Action dated Aug. 2, 2012, U.S. Appl. No. 13/218,982.
Notice of Allowance dated Sep. 6, 2011, U.S. Appl. No. 11/262,358, filed Mar. 28, 2005.
Chinese Office Action dated Mar. 24, 2011, Chinese Patent Application No. 200780036963.5 filed Sep. 13, 2007.
Supplementary European Search Report dated Mar. 10, 2011, European Patent Application No. 06825576.9 filed Oct. 6, 2006.
Russian Office Action dated Jul. 26, 2011, Russian Patent Application No. 2009112209 filed Sep. 13, 2007.
Response to Office Action dated Sep. 23, 2011, Russian Patent Application No. 2009112209.
Response to Office Action dated May 30, 2011, Chinese Patent Application No. 200780036963.5.
English translation of Amended Claims for Response to Office Action dated May 30, 2011, Chinese Patent Application No. 200780036963.5.
Office Action dated Sep. 28, 2011, Chinese Patent Application No. 200780036963.5.
Response to Office Action dated Nov. 4, 2011, Chinese Patent Application No. 200780036963.5.
English translation of Claims for Response to Office Action dated Nov. 4, 2011, Chinese Patent Application No. 200780036963.5.
Extended European Search Report dated Nov. 7, 2011, European Patent Application No. 07842406.6.
Dongwook Shin, et al., "Progressive Multi Gray-Leveling: A Voice Spam Protection Algorithm," IEEE Network, Sep. 1, 2006, vol. 20, No. 5, pp. 18-24.
Chinese Office Action dated Aug. 31, 2012, Chinese Patent Application No. 200680040336.4.

* cited by examiner

CALL ABUSE PREVENTION FOR PAY-PER-CALL SERVICES

BACKGROUND

The World Wide Web has made it easier for consumers and merchants to find each other. Consumers utilize search engines and keyword searches to identify merchants of desired goods and services. Web sites and other on-line research tools allow consumers to sift through the results to find merchants of particular interest. Merchants may use sponsored searches or pay for placement advertising in order to get their products and services identified for targeted consumers.

Notwithstanding the tremendous amount of information that may be obtained on the internet, many consumers still prefer to speak to a live person at the merchant's place of business in order to confirm details or find out additional information, and to complete a sale. While traditional public switched telephone networks (PSTN) are still a primary mode of communications, the use of Voice Over Internet Protocol (VoIP) is gaining popularity.

VoIP is a technology that allows users to make telephone calls using a broadband Internet connection instead of a regular phone line over the PSTN. Some services using VoIP may only allow users to call other people using VoIP. However, many services also allow users to call anyone who has a telephone number, including local, long distance, mobile, and international numbers. While some services only work over a computer or a special VoIP phone, other services allow use of a traditional telephone through an adaptor.

To encourage the use of VoIP, service providers have sought ways to make VoIP more convenient and efficient to use. For example, some VoIP providers offer technology that identifies potential telephone numbers in content on the Internet by highlighting telephone numbers found in a web page and associating a hyperlink which allows a user to initiate a telephone call to the highlighted number.

On-line advertising has expanded to take advantage of VoIP. For example, advertisers can provide a hyperlink for a merchant telephone number, and clicking on the link will initiate a call to the merchant in the so-called click-to-call (C2C) model. Further, merchants may subscribe to a service using a pay-per-click (PPC) model, where the merchant is charged each time a consumer clicks on an advertising link for that merchant. Also, since consumers may want to avoid the charges associated with making a phone call, merchants can purchase a toll-free telephone number and therefore pay for incoming calls by consumers.

This leads to a potential problem, however, as telephone spammers may abuse the system by making multiple calls to the merchant, either individually or as part of a computerized dialing scheme, as part of a telemarketing campaign, or worse, an intentional disruption directed at a specific merchant by a competitor.

SUMMARY

The present disclosure facilitates the use of a VoIP application (or other communication system) using a hyperlink in a user interface to initiate telephone calls from a web-based user, preferably to a merchant of goods and/or services. When the user clicks on the highlighted telephone number, the telephone number associated with the hyperlink will be provided to the communication application to facilitate making a telephone call. However, before the call is connected, the user is also asked to provide a telephone number to be called back for bridging the call, and abuse criteria are evaluated relative to that telephone number. If the abuse criteria are met, then the call is not connected.

In one embodiment, a first abuse criterion counts the number of times that calls back to the user go unanswered. If the number exceeds some preset limit, then the user will be restricted from connecting the call. For example, if the user does not answer three call backs, then the user may be restricted for a set time period, e.g., thirty minutes. If the pattern of abuse continues, for example, for twenty-four hours, then the restriction may be made longer or permanent. Restrictions may be recorded on a "black list" that is maintained by the communication system.

In another embodiment, a second abuse criterion counts a number of times that the same target telephone number has been called. If the number exceeds some preset limit, then a restriction will be imposed and the call will not be connected. The restriction may be imposed on the web-based user's telephone number or on the target telephone number. Alternatively, if the number exceeds some preset limit for a given time period, then the user will be restricted from connecting the call. For example, if the user tries to call the same merchant repeatedly, e.g., thirty calls within three minutes, then the user may be restricted for some duration, e.g., ten minutes. If the pattern of abuse continues, for example, for twenty-four hours, then the restriction may be made longer or permanent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The present disclosure describes the use of a VoIP application to initiate telephone calls from a web-based user. In one embodiment, a web page includes a call hyperlink that, when clicked by the user, starts a process for calling the telephone number associated with the hyperlink. The user is asked to provide a telephone number at which he/she wants to be called back. If the telephone number provided by the user is not on a restricted list that bars calls to or from that number, then the call will be connected by bridging the user's telephone number with the telephone number associated with the call hyperlink.

Advantageously, before the call is connected, abuse criteria are established and evaluated such that malicious and abusive schemes, including prank calls or telephone spamming, may be avoided. If the abuse criteria are met, then the call is not connected. Further, restrictions may be placed on the telephone number of the abusive caller to prevent that caller from placing additional calls for some period of time. Alternatively, restrictions may be placed on the target telephone number. One abuse criterion tracks the number of times that calls back to the telephone number provided by the web-based user go unanswered. Since it is odd to give out a telephone number and then not answer it when the system calls back to bridge the call, restrictions are placed on the user's telephone number if the criterion is met. Another abuse criterion tracks multiple calls to the same telephone number within a short period of time. Restrictions may be placed on the user's telephone number or the target telephone number if the criterion is met. These criteria can be designed to result in multiple restriction levels if the user is identified as abusive. For example, a first restriction may be for a limited duration, a second restriction level may be for a longer duration, and a third restriction level may be permanent.

Figure 1:
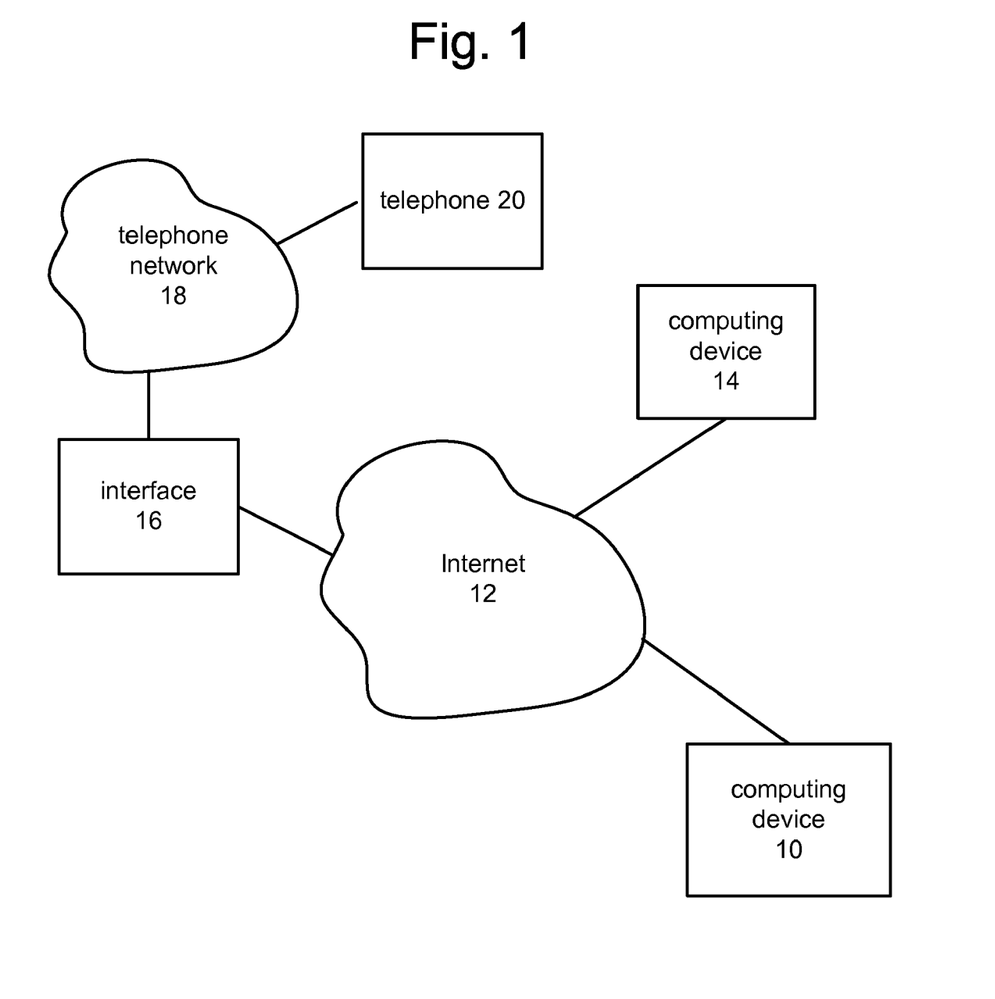
FIG. 1 is a block diagram illustrating one embodiment of a system that provides for voice communication over a network.

FIG. 1 is a general block diagram depicting one embodiment of a system that provides for communication (e.g., VoIP) over a network, where computing device 10 is in communication with a network 12, such as the Internet. Computing device 10 can be any suitable computing device including a personal computer, notebook computer, handheld device, mobile telephone, etc. Computing device 10 includes adequate software and/or hardware to allow communication over Internet 12. For example, computing device 10 may include a VoIP software application that communicates over a network interface.

FIG. 1 also shows computing device 14 and interface 16 in communication with Internet 12. Interface 16 is also in communication with telephone network 18. Computing device 14 can be any type of computing device that can communicate with other computing devices. Telephone network 18 is the well known public switched telephone network (PSTN). Interface 16 includes hardware that provides an interface between the legacy telephone network 18 and the data network of Internet 12. For example, interface 16 can be one or more computers that receive VoIP communications via Internet 12 and transfer those communications to telephone network 18, as well as transfer voice communications from telephone network 18 to VoIP communications over Internet 12. It is contemplated that a user of computing device 10 will make a telephone call using VoIP technology to another user on computing device 14, or to a user of a conventional, wireless, or cellular telephone through telephone network 18. In other embodiments, the user making the telephone call can be using a standard telephone with an adaptor rather than computing device 10.

Figure 2:
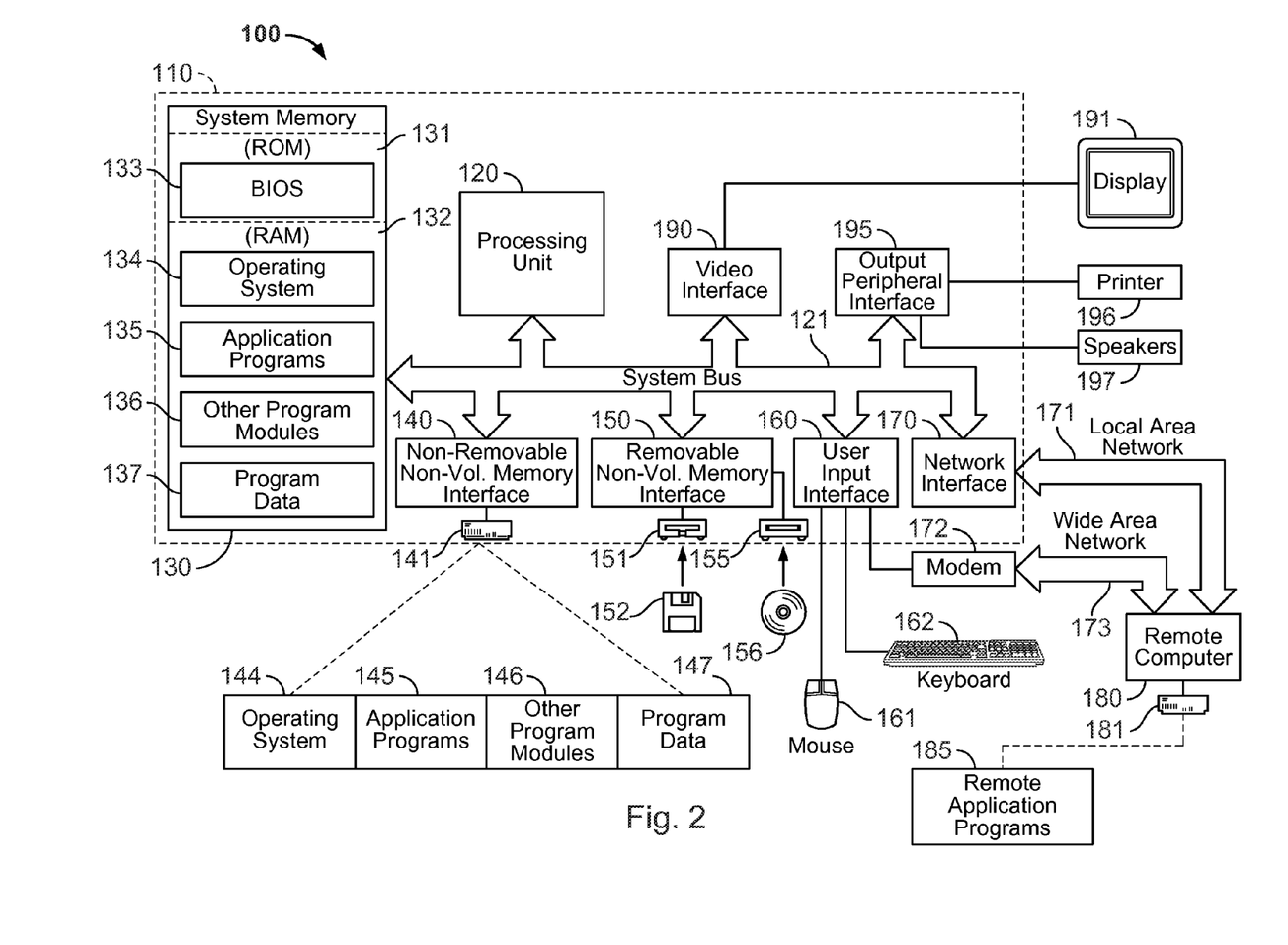
FIG. 2 is a block diagram illustrating one embodiment of a typical computing system.

FIG. 2 illustrates one example of a suitable general computing environment 100 that may be used to implement some of the components illustrated in FIG. 1. For example, computing system 100 can be used to implement user computing device 10, computing device 14, or interface 16. It should be noted that computing system 100 is only one example of a suitable computing environment and is not intended to suggest any limitation as to the scope of use or functionality of the technology described herein. Neither should computing system 100 be interpreted as having any dependency or requirement relating to any one or combination of components illustrated in the exemplary operating environment 100.

The technologies described herein are operational with numerous general purpose or special purpose computing system environments or configurations. Examples of well known computing systems, environments, and/or configurations that may be suitable for use include, but are not limited to, personal computers, server computers, hand-held or laptop devices, personal digital assistants, telephones (wired, wireless, or cellular), multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be implemented in distributed computing environments where tasks are performed by remote processing devices that are linked through a communications network. In a distributed computing environment, program modules may be located in both local and remote computer storage media including memory storage devices.

With reference to FIG. 2, an exemplary computing system includes a general purpose computer 110. Components of computer 110 may include, but are not limited to, a processing unit 120 (which can include multiple processors), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data to program the processor(s) to perform the methods described herein. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet. In one embodiment, computing device 10 of FIG. 1 is implemented by computing device 110, and computing device 14 could be implemented by remote computer 180.

When used in a LAN networking environment, computer 110 is connected to LAN 171 through a network interface or adapter 170. When used in a WAN networking environment, computer 110 typically includes a modem 172, network interface or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

One embodiment of the present system is directed to the specific example where a web-based user initiates a telephone call via a hyperlink on a web page. In this specific example, the user is a customer and the call is intended to be placed to a merchant, although the call could be placed to an individual or any other legitimate telephone number. The hyperlink is a feature of a click-to-call service that is provided by a service provider, which may be an enterprise service provider, such as MSN®, Yahoo®, AOL®, or other online service providers.

Figure 3:
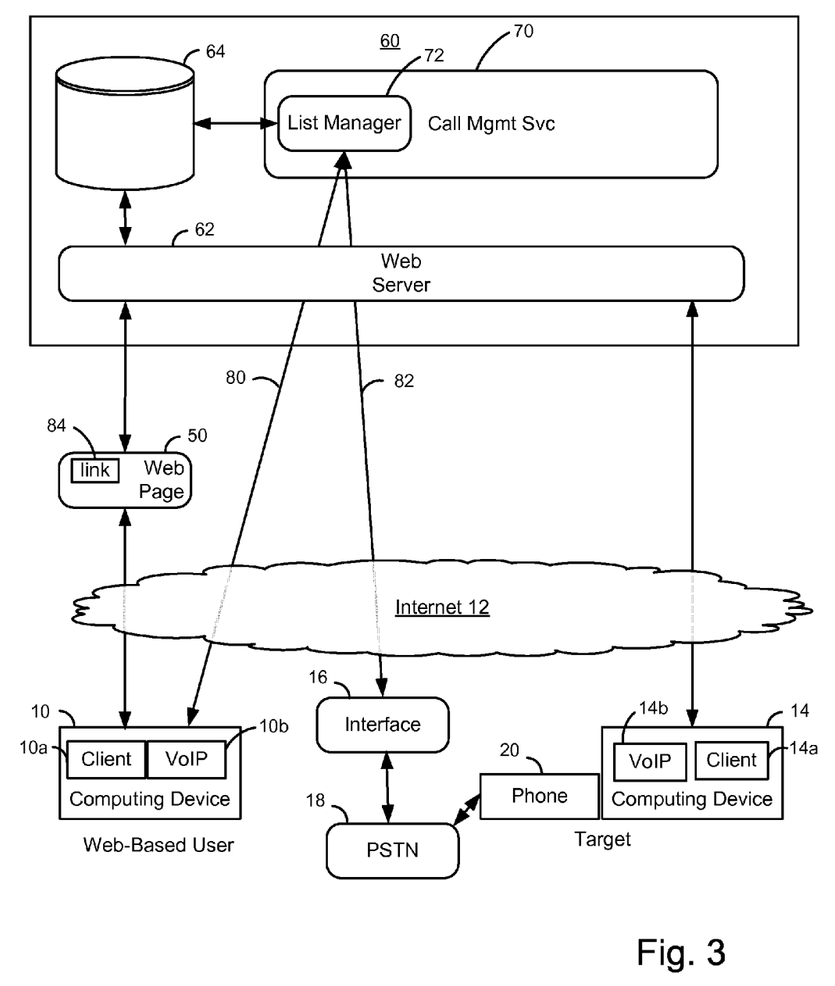
FIG. 3 is a block diagram illustrating a more detailed embodiment of the voice communication system of FIG. 1.

With reference to FIG. 3, a more detailed illustration of a typical computer-based voice communication system is provided. In this example, the web-based user is using computing device 10, which includes a client application 10a, such as a web browser, and a VoIP application 10b. It is understood that client application 10a may be another type of client application, including for example, an instant messaging (IM) client incorporating VoIP capabilities. In one embodiment, the web-based user seeks to initiate a telephone call to target telephone 20, which is coupled to the standard PSTN network 18, and accessible via interface 16. Target telephone 20 may be any type of standard landline, wireless, or cellular telephone device, and may belong to an individual or a merchant, for example. In another embodiment, the target telephone may also be web-based, where computing device 14 is configured to have a client application 14a, such as a web browser, and a VoIP application 14b.

Figure 4:
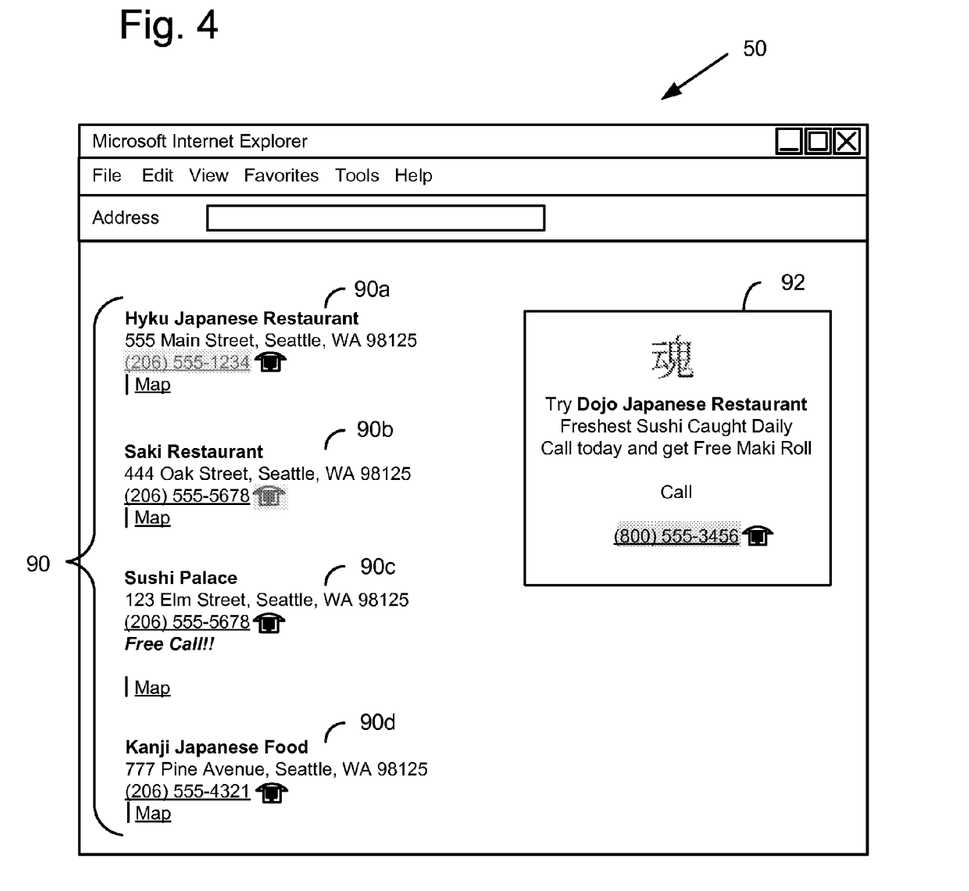
FIG. 4 is an example of a web page displaying search results.

The web-based user utilizes computing device 10 to access the World Wide Web through its browser 10a establishing communication with Internet 12, for example, to obtain and view a copy of web page 50. Web page 50 may be any page from the World Wide Web on which telephone numbers are listed, such as a merchant advertisement or a directory listing. In one embodiment, web page 50 may be search results from a search generated from a search engine. One example of a search results web page 50 is shown in FIG. 4, described below.

In some embodiments, web page 50 is generated by a web server 62, which is part of service provider 60. However, it is understood that web page 50 may be included on a web server which is located outside of and independent from service provider 60. Whether it is part of web server 62, or merely in communication with web server 62, the information displayed on web page 50 is typically updated from database 64 at the service provider 60 before being rendered on web page 50.

In one embodiment, the service provider 60 implements a free click-to-call service, wherein the service provider pays for VoIP telephone calls made by a web-based caller to a target telephone number, particularly where the telephone call is initiated from an advertisement displayed on a web page by the service provider.

In one embodiment, merchants sign up with a service provider 60 a unique identifier is used for merchant(s) displayed on a web page 50, and the unique identifier is compared against the unique identifiers stored on the database 64 to determine which, if any, of the merchants to be rendered on web page 50 have subscribed to the click-to-call service.

In one embodiment, the merchant signs up with the service provider 60 for a click-to-call service, which may be part of the pay-per-click subscription service described in the Background section. As one example, a merchant can pay the service provider one price for any VoIP calls placed, as well as for the ranking of the merchant's advertisement on a web page. In further embodiments, merchants might pay the service provider only for the display of their advertisements or to see call reporting data that help merchants track advertising campaigns or optimize staffing to better accommodate demand patterns, with the service provider covering all costs of the calls.

Upon subscription to the click-to-call service, each subscribing merchant is added to a "white list," which is stored on a secure database 64 within service provider 60. The white list may also be stored on databases outside of the service provider in alternative embodiments. For each subscribing merchant, the white list stores a unique identifier which is mapped within the database to the merchant's name, telephone number, and, in some embodiments, other identifying merchant information. The white list is kept current and updated in real time to ensure that when a merchant's advertisement is placed and validated from the white list, it contains the most current information relating to the merchant and the merchant's subscription to the click-to-call service.

Telephone listings rendered on web page 50 typically include graphical indicators indicating the click-to-call feature. For example, FIG. 4 shows the results of a sample search for Japanese restaurants in the Seattle, Wash. area on web page 50. The search results include advertising listings 90 and a larger space advertisement 92. As shown in FIG. 4, the click-to-call service may be indicated by any of a variety of graphical indicators.

For example, in listing 90a and in the larger space advertisement 92, the click-to-call service is indicated by highlighting or shading the telephone number. The click-to-call feature may alternatively or additionally be indicated by a highlighted, shaded and/or dedicated icon as part of the listing, such as the highlighted telephone icon shown in advertising listing 90b. Additionally or alternatively, the click-to-call feature may be indicated by the words "Free Call!!" or other verbal phrase, as shown in advertising listing 90c. Those of skill in the art would appreciate that there are many other ways of visually indicating to potential callers the click-to-call feature according to the present system.

In some embodiments, all telephone numbers listed on web page 50 are provided with a click-to-call indicator. In other embodiments, the click-to-call indicator is only activated for telephone numbers that have been subscribed to the service. Thus, for example, as shown in FIG. 4, the advertiser at listing 90d does not subscribe to the service and therefore its listing does not include any graphical indicator for a call hyperlink.

However, a service provider may elect to provide the click-to-call feature to all advertisers returned in a search results page or otherwise provided on a web page 50 regardless of whether the advertisers specifically pay for that feature. In such embodiments, the service provider may still generate revenue from the merchants by providing demographic information regarding VoIP telephone calls made, for example. As shown in FIG. 4, the click-to-call service may be associated with toll-free numbers, as shown in the larger space advertisement 92, as well as with toll numbers, as shown in advertising listings 90.

Web-based users may access a web page 50 having telephone listings, such as a directory search result or merchant advertisement, over a network, such as the Internet 12. Web-based users who wish to establish a telephone session with a telephone number listed on web page 50 may click on an advertisement, telephone number, and/or icon including the click-to-call hyperlink and associated indicator as displayed on web page 50.

A call hyperlink 84 incorporated onto web page 50 permits the user to place a VoIP call from a web page or application, and allows a PC-to-telephone call and a PC-to-PC call. The PC-to-telephone call originates from computer 10 and terminates at telephone 20, which may be a fixed line or wireless telephone, or a cellular or satellite phone. The PC-to-PC call includes voice, video and optional text chat. This call originates from a PC 10 and also terminates at a PC 14, for example. Thus, computing device 14 may additionally or alternatively have VoIP capability through VoIP application 14b. The types of target addresses in a call hyperlink may include a telephone number, a contact (e.g., in an address book), a computer name (e.g. JohnDoe PC) or an IP address (e.g. 124.38.110.25).

The call hyperlink is a well known feature provided by service providers and need not be described in detail herein. For example, the service provider 60 may have a call management service 70, such as Windows Live (http://get.live.com), that is utilized to implement the call hyperlink and related functions as well as the filters described below. Further, the call management service 70 includes a list manager 72 that implements filters for evaluating abuse criteria, and coordinates the designation of telephone numbers stored on the white list and the black list in database 64.

Figure 5:
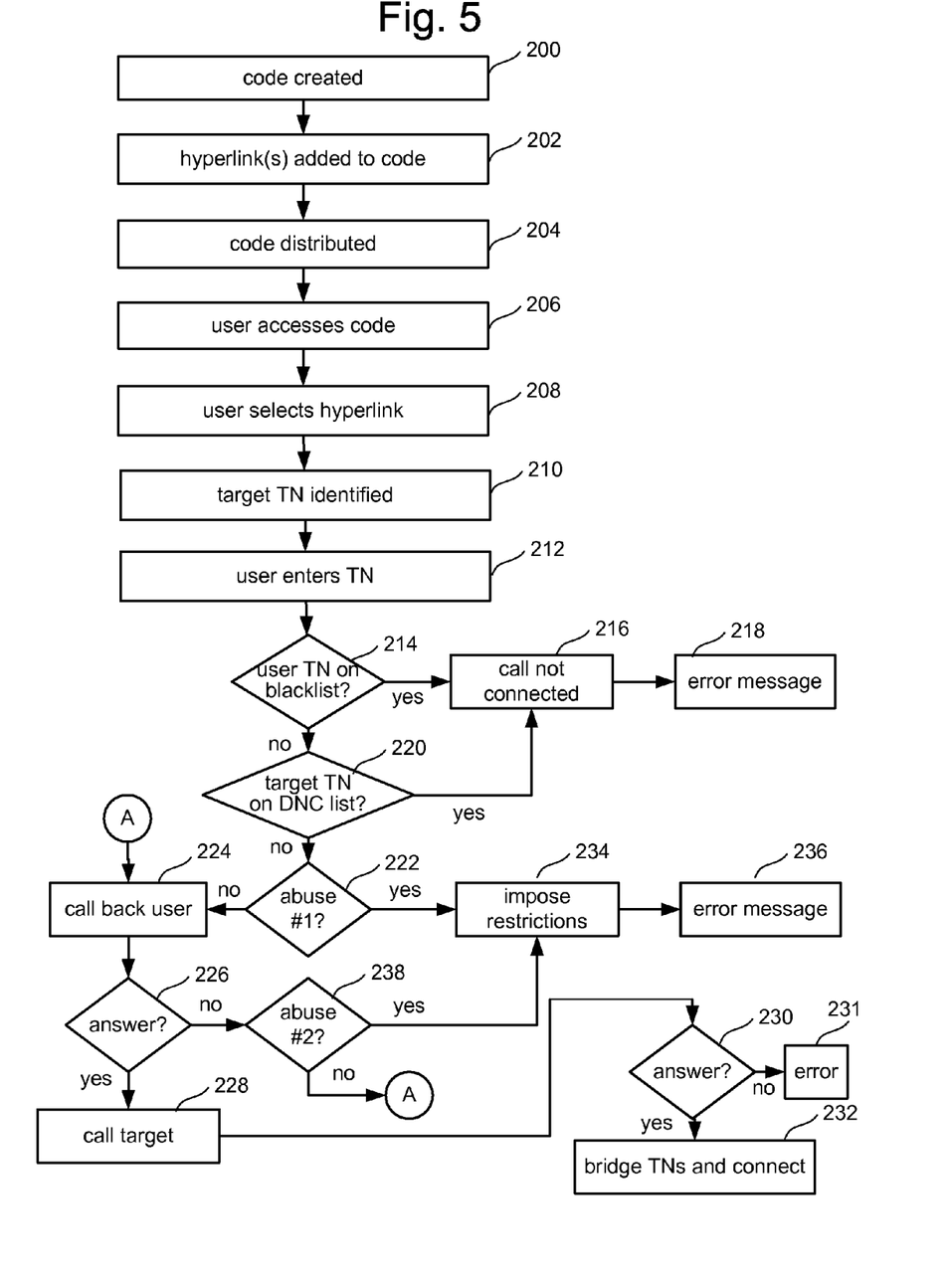
FIG. 5 is a flowchart describing one embodiment of a process for using hyperlinks with a communication system.

FIG. 5 is a high level flowchart describing one embodiment of a process for using the call hyperlinks. In step 200, code for a web page or other interface is created. In step 202, one or more call hyperlinks are added to the code. In step 204, the code is distributed. In one embodiment, the code can be distributed via Internet 12 when users navigate to an appropriate web site. In other embodiments, the code is part of an application that is distributed through the Internet, retail stores or other means. In step 206, a user accesses the code. For example, a user may navigate to a web site and download one or more web pages or launch an application. In step 208, the user selects a call hyperlink on a web page or document by clicking on it. For example, a web site may include a web page having a listing for a certain restaurant, such as in FIG. 4, where the listing includes a call hyperlink marked with the invitation "Call for Free!" Clicking on the call hyperlink causes the target telephone number associated with the call hyperlink to be identified and retrieved from database 64 in step 210.

In some VoIP embodiments, clicking on the call hyperlink directly initiates the VoIP telephone session. However, in the present embodiment, for security reasons, clicking on the telephone number on web page 50 (step 208) does not directly initiate the VoIP telephone session even though the target number was identified in step 210. Otherwise, it may be possible for users to hijack the listed telephone call hyperlink to place a VoIP telephone call using the displayed link to a recipient other than the target telephone number.

Thus, in response to selecting the call hyperlink in step 208 and the target number being identified to the system in step 210, the web-based user is presented with a pop-up screen in step 212 that asks for a telephone number where the user wants to be called back. Upon entering the user's call back telephone number, both the user's call back telephone number and the target telephone number are compared against restricted lists stored on database 64. Thus, in step 214, the user's telephone number is compared against a "black list" of restricted numbers on database 64. If the user's telephone number is on the black list, then the call will not be connected in step 216, and the user receives an error message in step 218. Likewise, in step 220, the target telephone number associated with the call hyperlink is also compared against a "do not call" list stored on database 64. If the target telephone number is on the do not call list, then the call will not be connected in step 216, and the user receives an error message in step 218.

If neither telephone number is restricted, then predefined first abuse criteria are evaluated in step 222. The first abuse criteria may be implemented as one or more software filters, as further detailed in FIG. 6 below. However, in general, the first abuse criteria track patterns of abuse by the user (originating caller) and impose restrictions when the abuse patterns exceed predefined limits. The first abuse criteria also tracks excessive calling to a target number, even if not from a single originating number. Restrictions are imposed on the user's telephone number, or on the target telephone number, depending on the nature of the abuse.

If the first abuse criteria are not met, then in step 224, the user is called back at the telephone number identified in step 212. If the user answers the call back in step 226, then the target number is called in step 228. If the target number is answered in step 230, then the system bridges the two numbers and connects the call in step 232.

If the first abuse criteria are met, then in step 234, restrictions are imposed on either the user's telephone number, or on the target telephone number, depending on the nature of the abuse, and an error message is generated in step 236.

If the user does not answer the call back in step 226, then predefined second abuse criteria are evaluated in step 238. The second abuse criteria may also be implemented as one or more software filters, as further detailed in FIG. 7 below. However, in general, the second abuse criteria tracks multiple failures by the user (originator) to answer call backs in step 226.

If the second abuse criteria are not met, then the process returns to step 224 and calls the user back again. Multiple failures to answer will eventually satisfy the criteria of the second filter.

If the second abuse criteria are met (meaning that an abusive or suspicious condition exists), then restrictions are imposed in step 234, and an error message generated in step 236.

In one embodiment, a VoIP client may be downloaded to the computing device 10 of the web-based user. In such embodiments, the list manager 72 may include a software dialer of known design for initiating a VoIP telephone call from the web-based user over a VoIP connection 80, which call may then be routed over a node to a PSTN telephone company partner 18 through interface 16 over a connection 82. Thereafter, the telephone company partner may connect the PSTN telephone call to a telephone 20.

The above described steps for evaluating abuse criteria may be invisible to the caller. Once a call is initiated by the web-based user clicking on the call hyperlink, the user may simply hear his/her phone ringing and answer in step 226, then hear the called number ringing and the merchant answer the call in step 230. Thereafter, the numbers are bridged and connected in step 232, and the call session between the web-based user and the target telephone number takes place.

List manager 72 may include suitable software for preventing click fraud. Click fraud may occur, for example, where competitors try and increase the cost to a merchant by making repeated VoIP calls to a merchant. Alternatively, click fraud may be propagated by pranksters, e.g. children who make repeated telephone calls to a number, or who list someone else's number in response to the request in step 210 of FIG. 5. List manager 72 may address this problem by limiting calls from a single caller.

Figure 6:
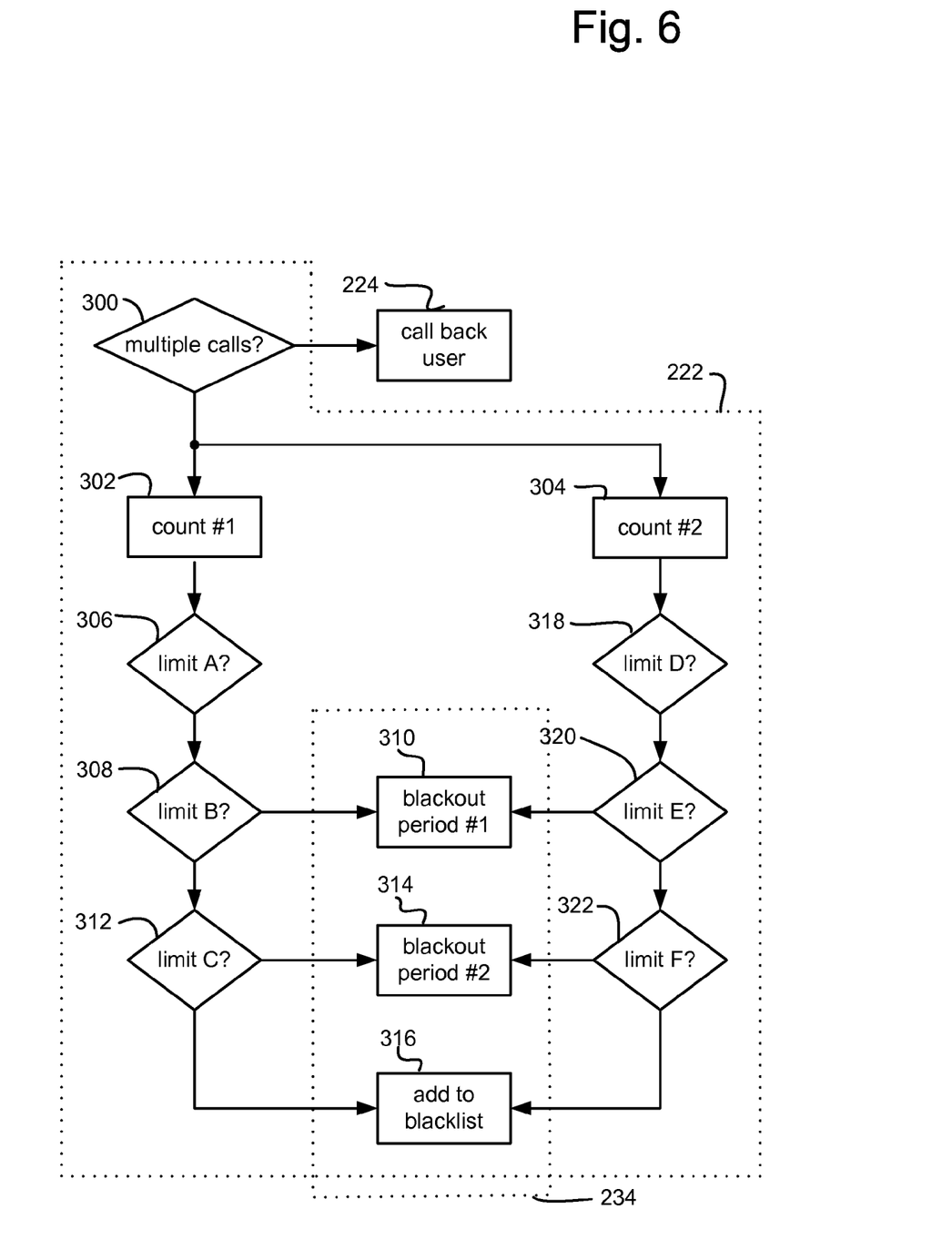
FIG. 6 is a flowchart describing one embodiment of a process performed by the voice communication system of FIG. 3 in response to selection of a hyperlink on a web page.

More particularly, the list manager 72 may include logic filters that allow criteria to be set for identifying suspicious or problem callers in steps 222 and 238. For example, FIG. 6 illustrates one process for identifying an abusive pattern of calling from web-based users in step 222. This process includes filters to track the pattern where web-based users make multiple calls to the same target telephone number within a short time period. After verifying that the web-based user's telephone number is not on the black list in step 214, and that the target telephone is not on a do not call list in step 220, the list manager 72 checks to see how many calls have been placed to the target telephone number within a recent time period in step 300. For example, an initial threshold level may be set at 3 calls within 3 minutes. If that level is not exceeded, then the user is called back in step 224 and the process continues.

If instead, the threshold level is exceeded, the two parallel paths are processed. In step 302, the list manager 72 counts the number of times that the web-based user's telephone number has initiated calls. In step 304, the list manager 72 counts the number of times that the target telephone number has been called.

Proceeding down the path beginning with step 302, a first limit A is evaluated in step 306. For example, limit A may be set to track whether the web-based user has been called back three times within three minutes. If the limit A is not met, then the process continues by calling back the web-based user in step 224. However, if the limit A has been met, then the process will also evaluate limit B in step 308. For example, limit B may be set to track whether the web-based user has been called back six times within six minutes. If limit B is not met, then a first blackout period will be imposed on the web-based user's telephone number in step 310. For example, the first blackout window may impose a ten minute restriction on connecting calls to the web-based user's telephone number. If limit B is met, then the process will evaluate limit C in step 312. For example, limit C may be set to track whether the web-based user has exceeded limit B four times in twenty-four hours. If not, then a second blackout window is imposed on the web-based user's telephone number in step 314. For example, the second blackout window may impose a sixty minute restriction on connecting calls to the web-based user's telephone number. If limit C is met, then web-based user's telephone number is added to the blacklist in step 316.

Proceeding down the path beginning with step 302, a first limit D is evaluated in step 318. For example, limit D may be set to track whether the target telephone number has been called thirty times within three minutes. If the limit D is not met, then the process continues by calling back the web-based user in step 224. However, if limit D has been met, then the process will also evaluate limit E in step 320. For example, limit E may be set to track whether the target telephone number has been called fifty times within five minutes. If limit E is not met, then a first blackout period will be imposed on the target telephone number in step 310, e.g., a ten minute restriction on connecting calls to the target telephone number. If limit E is met, then the process will evaluate limit F in step 322. For example, limit F may be set to track whether limit E for calling the target telephone number has been exceeded four times in twenty-four hours. If not, then a second blackout window is imposed on the target telephone number in step 314. For example, the second blackout window may impose a sixty minute restriction on connecting calls to the target telephone number. If limit F is met, then the target telephone number is added to the blacklist in step 316. Note that while restrictions in steps 310, 314, and 316 are shown as the same for both parallel paths from steps 302 and 304, different restrictions could be imposed for any or all of the different limit inquiries.

Figure 7:
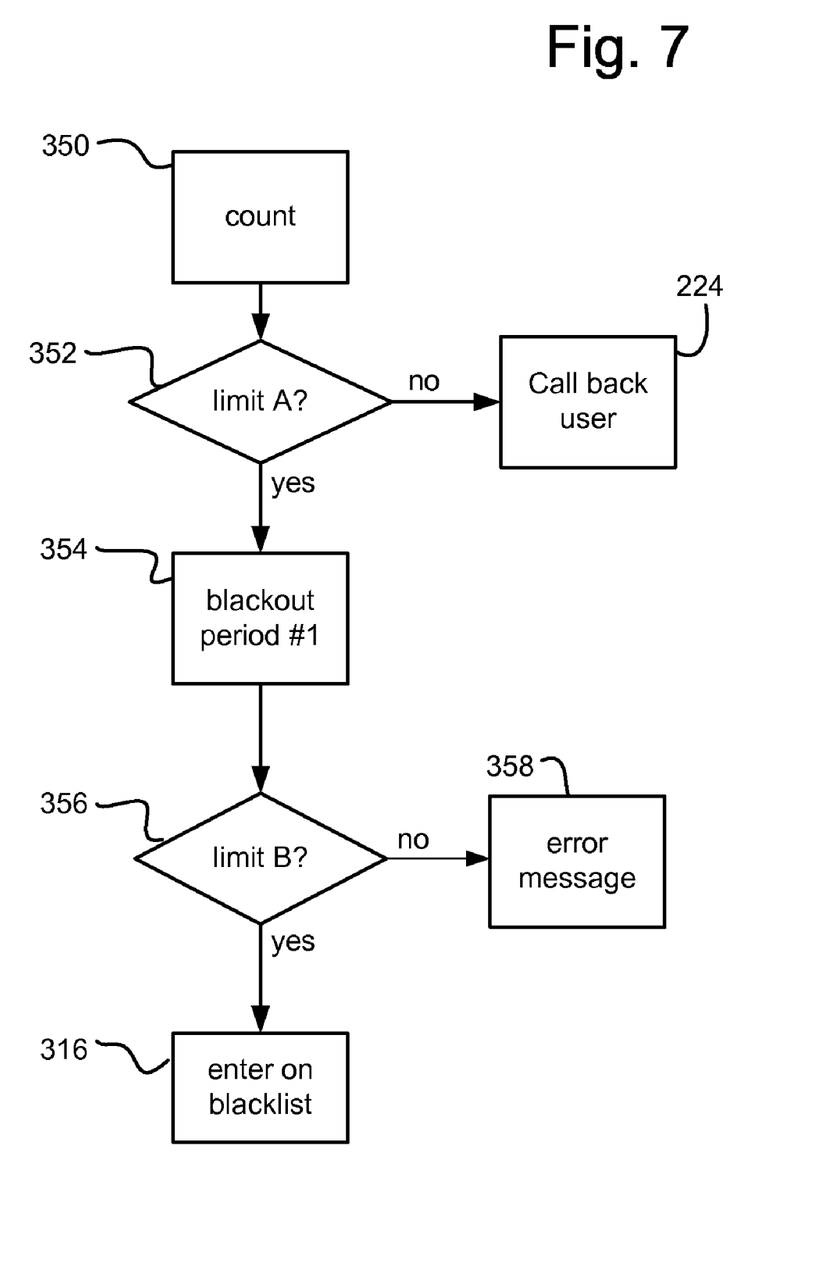
FIG. 7 is a flowchart describing another embodiment of a process performed by the voice communication system of FIG. 3 in response to selection of a hyperlink on a web page.

Another process for identifying an abusive pattern of calling from a web-based user is illustrated in FIG. 7. This second filter tracks the scenario where the web-based user fails to answer call backs to the telephone number entered by the user in step 226. In step 350, the list manager 72 counts how many times the web-based user has failed to answer call backs in step 226. If the first limit set in step 352 is exceeded by the count, then a first blackout period is imposed on the web-based user's telephone number in step 354. For example, the first limit may be set to three unanswered calls, and the blackout period may be set to thirty minutes from the third unanswered call. If the count does not exceed the preset first limit, then the process continues. In step 356, a second limit counts how many times the first limit has been exceeded in some time period. For example, if the same web-based user is blacked out four times within a twenty four hour period, then the restriction is made permanent by adding the web-based user's telephone number to the black list in step 316. If the second limit is not exceeded, then no further action is taken in step 358 since the first blackout period was imposed on the web-based user's telephone number in step 354.

It should be readily evident that numerous filters could be implemented based on a variety of criteria. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for establishing voice communications between a computing device and a telephone, comprising:
providing a user interface to a computing device, the user interface including a link to a target telephone number associated with a merchant;
receiving a selection of the link from the computing device, said selection identifying the target telephone number associated with the merchant;
receiving a user telephone number associated with a user of the computing device;
evaluating abuse criteria with respect to at least one of the user telephone number and the target telephone number, the abuse criteria including first abuse criteria for counting a number of times that calling back the user telephone number results in unanswered calls;
in response to meeting the first abuse criteria, communicating an error message to the computing device and precluding a voice connection between the target telephone number and the user telephone number if more than one blackout period is imposed on the target telephone number or the user telephone number within a time period; and
in response to not meeting the first abuse criteria, establishing the voice connection between the target telephone number and the user telephone number by calling back the user telephone number.

2. The method of claim 1, wherein the evaluating step includes evaluating the abuse criteria with respect to both telephone numbers.

3. The method of claim 1, wherein the link is a hyperlink in a first web page that identifies the target telephone number for the voice connection, and the voice connection is a VoIP connection.

4. The method of claim 1, wherein the evaluating step includes setting a first limit on the number of times that the calling back step results in unanswered calls back to the user telephone number, and precluding the voice connection for a first blackout period if the count exceeds the first limit.

5. The method of claim 4, wherein the evaluating step includes setting a second limit on the number of times that the calling back step results in unanswered calls back to the user telephone number, and precluding the voice connection for a second blackout period if the count exceeds the second limit, wherein the second limit is greater than the first limit and the second blackout period is greater than the first blackout period.

6. The method of claim 5, wherein the evaluating step includes precluding the voice connection indefinitely if more than one first blackout period has been imposed on the user telephone number at least twice within twenty-four hours.

7. The method of claim 1, wherein the abuse criteria include second abuse criteria for counting a number of times that the target telephone number has been called.

8. The method of claim 7, wherein the evaluating step includes setting a first limit on the number of times that the target telephone number can be called within a first time period, and precluding the voice connection for a first blackout period if the count exceeds the first limit within the first time period.

9. The method of claim 8, wherein the evaluating step includes setting a second limit on the number of times that the target telephone number can be called within a second time period, and precluding the voice connection for a second blackout period if the count exceeds the second limit within the second time period.

10. The method of claim 9, wherein the evaluating step includes precluding the voice connection indefinitely if more than one second blackout period has been imposed on the target telephone number at least twice within twenty-four hours.

11. The method of claim 1, wherein the evaluating step includes setting a first limit on the number of times that the calling back step results in unanswered calls back to the user telephone number, and precluding the voice connection for a first blackout period if the count exceeds the first limit, and wherein the evaluating step further includes setting a second limit on the number of times that the target telephone number can be called within a first time period, and precluding the voice connection for a second blackout period if the count exceeds the second limit within the first period.

12. A method for establishing voice communications between a first communications device and a second communications device over a network, comprising:
- receiving a selection of a link from the first communications device, said selection identifying a second telephone number associated with the second communications device, the second communications device associated with a merchant;
- receiving a first telephone number associated with the first communications device;
- establishing abuse criteria with respect to the first and second telephone numbers, the abuse criteria including first abuse criteria for counting a number of times that calling back the first telephone number results in unanswered calls;
- in response to meeting the first abuse criteria, communicating an error message to the first communications device and precluding a voice connection between the first communications device and the second communications device if more than one blackout period is imposed on the first telephone number or the second telephone number within a period of time; and
- in response to not meeting the first abuse criteria, establishing the voice connection between the first communications device and the second communications device by calling back the first telephone number.

13. The method of claim 12, wherein the step of establishing abuse criteria defines second abuse criteria for counting a number of times that the second telephone number has been called within a time period.

14. A method for establishing voice communications between a first telephone number and a second telephone number, comprising:
- receiving a request from a VoIP device to connect the first telephone number to the second telephone number;
- evaluating abuse criteria with respect to at least one of the first and second telephone numbers, the abuse criteria including first abuse criteria for counting a number of times that calling back the first telephone number results in unanswered calls;
- in response to meeting the first abuse criteria, precluding a voice connection between the first telephone number and the second telephone number if more than a blackout period is imposed on the first telephone number or the second telephone number within a time period; and
- in response to not meeting the first abuse criteria, connecting the first telephone number to the second telephone number by calling back the first telephone number.

15. The method of claim 14, further comprising precluding connecting the first telephone number to the second telephone number for a blackout period if the first abuse criterion is met.

16. The method of claim 14, wherein the step of evaluating abuse criteria defines second abuse criteria for counting a number of times that the second telephone number has been called within a time period.

17. The method of claim 16, further comprising precluding connecting the first telephone number to the second telephone number for a blackout period if the second abuse criterion is met.

18. The method of claim 7, wherein the evaluating step comprises:
- in response to meeting the second abuse criteria, communicating an error message to the computing device and precluding the voice connection between the target telephone number and the user telephone number if more than one blackout period is imposed on the target telephone number within a time period; and
- in response to not meeting the second abuse criteria, calling back the user telephone number and establishing the voice connection between the target telephone number and the user telephone number if the user answers the call back.

19. The method of claim 13, wherein the establishing step comprises:
- in response to meeting the second abuse criteria, precluding the voice connection between the first communications device and the second communications device if at least one blackout period is imposed on the second telephone number within a time period; and
- in response to not meeting the second abuse criteria, calling back the first telephone number and establishing the voice connection between the first communications device and the second communications device if said calling back the first telephone number results in an answered call.

20. The method of claim 16, wherein the evaluating step comprises:
- in response to meeting the second abuse criteria, precluding the voice connection between the first telephone number and the second telephone number if more than one blackout period is imposed on the second telephone number within a time period; and
- in response to not meeting the second abuse criteria, calling back the first telephone number and connecting the first telephone number to the second telephone number if said calling back the first telephone number results in an answered call.

* * * * *